US011258613B2

(12) United States Patent
Roscoe et al.

(10) Patent No.: US 11,258,613 B2
(45) Date of Patent: Feb. 22, 2022

(54) METHOD AND DEVICE FOR ELECTRONIC SIGNATURE

(71) Applicant: CROSBIL LTD., Oxford (GB)

(72) Inventors: Andrew William Roscoe, Oxford (GB); Bangdao Chen, Shenzhen (CN)

(73) Assignee: CROSBIL LTD., Oxford (GB)

( * ) Notice: Subject to any disclaimer, the term of this patent is extended or adjusted under 35 U.S.C. 154(b) by 152 days.

(21) Appl. No.: 16/757,424

(22) PCT Filed: Apr. 23, 2018

(86) PCT No.: PCT/CN2018/084095
§ 371 (c)(1),
(2) Date: Apr. 20, 2020

(87) PCT Pub. No.: WO2019/076019
PCT Pub. Date: Apr. 25, 2019

(65) Prior Publication Data
US 2020/0344064 A1    Oct. 29, 2020

(30) Foreign Application Priority Data

Oct. 18, 2017  (CN) .......................... 201710971647.2

(51) Int. Cl.
*H04L 29/06*     (2006.01)
*H04L 9/32*      (2006.01)
(Continued)

(52) U.S. Cl.
CPC .......... *H04L 9/3247* (2013.01); *H04L 9/0637* (2013.01); *H04L 9/083* (2013.01); *H04L 9/0825* (2013.01); *H04L 9/3242* (2013.01)

(58) Field of Classification Search
CPC ... H04L 9/3247; H04L 9/0637; H04L 9/0825; H04L 9/083; H04L 9/3242; H04L 9/3236
See application file for complete search history.

(56) References Cited

U.S. PATENT DOCUMENTS

2007/0038862 A1* 2/2007 Noble ................ H04N 21/4331
713/176
2012/0250865 A1* 10/2012 Terpstra ................ H04L 63/062
380/279
(Continued)

FOREIGN PATENT DOCUMENTS

CN     105592098 A     5/2016
CN     106789041 A     5/2017
(Continued)

*Primary Examiner* — Sher A Khan
(74) *Attorney, Agent, or Firm* — Soroker Agmon Nordman Pte Ltd

(57) ABSTRACT

Disclosed are methods and apparatuses for electronic signature. The method for electronic signature comprises obtaining a hash value of a first key created for a user and a user identifier of the user, generating a key certificate of the first key based on the obtained hash value, the user identifier and a current key, recording the key certificate on a public medium, which public medium ensures that information published thereon is not tampered with, signing a file with the first key and recording a resulting file signature and the file on the public medium, and recording the first key on the public medium only after the file is already on the public medium. With the technical solution of the disclosure, a key can be effectively utilized.

15 Claims, 1 Drawing Sheet

(51) Int. Cl.
*H04L 9/06* (2006.01)
*H04L 9/08* (2006.01)

(56) References Cited

U.S. PATENT DOCUMENTS

| | | | |
|---|---|---|---|
| 2017/0005804 A1* | 1/2017 | Zinder | G06F 21/6254 |
| 2017/0220815 A1* | 8/2017 | Ansari | G06Q 20/389 |
| 2017/0279783 A1* | 9/2017 | Milazzo | B29C 64/00 |
| 2019/0080392 A1* | 3/2019 | Youb | G06F 21/64 |
| 2021/0194702 A1* | 6/2021 | Roscoe | H04L 9/0894 |

FOREIGN PATENT DOCUMENTS

| | | | |
|---|---|---|---|
| CN | 107196966 A | | 9/2017 |
| CN | 106789041 B | * | 7/2019 |

* cited by examiner

METHOD AND DEVICE FOR ELECTRONIC SIGNATURE

TECHNICAL FIELD

The embodiments of the disclosure relate to the field of electronic signature technologies, and in particular, to a method and apparatus for electronic signature.

BACKGROUND OF THE INVENTION

With the rapid development in information technology and network technology, information has been increasingly transmitted through networks. In order to ensure the authenticity, validity and integrity of the information transmitted over networks, the transmitted information can be electronically signed. A common and mature implementation of electronic signatures is digital signature technology. The digital signature technology is implemented with key encryption technology. Existing digital signature technologies include asymmetric cryptography, symmetric cryptography, and the like. Asymmetric cryptography is currently widely used. Asymmetric cryptography uses a pair of a public key and a private key, taking advantage of the fact that private keys cannot be cracked in polynomial time. However, developments in quantum computers and Shor's algorithm impose a threat to the unbreakable nature of asymmetric cryptography method.

Researches have been conducted on signature models and asymmetric cryptography that are not susceptible to quantum computing attacks which however bring little success. Among others, lattice-based cryptography seems promising, but it is still not a mature technology.

In the process of key generation, a plurality of keys are generated and a corresponding time of publication is determined for each key. That is, a key is published at the time of publication thereof. This may be problematic if the key has not been used at the time of publication. In this situation, the key has to be published, resulting in a waste of the key. The time of publication herein refers to the time at which the key is to be released. More details can be found in PCT Application No. PCT/CN2017/100685, filed by the same applicant on Sep. 6, 2017, the entire disclosure of which is hereby incorporated by reference.

SUMMARY OF THE INVENTION

In view of the above technical problems, the disclosure provides a method and apparatus for electronic signature which are capable of efficiently utilizing a key.

In an aspect of the disclosure, a method for electronic signature is provided. The method can comprise obtaining a hash value of a first key created for a user and a user identifier of the user; generating a key certificate of the first key based on the obtained hash value, the user identifier and a current key; recording the key certificate on a public medium, wherein the public medium is configured to ensure information published thereon being not tampered with; signing a file with the first key and recording a resulting file signature and the file on the public medium; and recording the first key on the public medium only after the file are already on the public medium.

In some embodiments, the public medium can be a blockchain.

In some embodiments, the public medium can be a bulletin board operated by a trusted third party.

In some embodiments, the public medium can be a write-only database. Each data block written into the write-only database can be irrevocable and a consensus can be reached among all users.

In some embodiments, the number of the file can be one.

In some embodiments, recording the first key on the public medium only after the file is already on the public medium further can comprise, after the file is already on the public medium, signing a message indicative of the number of the files with the first key and recording a resulting message signature and the message on the public medium, and recording the first key on the public medium.

In some embodiments, recording the first key on the public medium only after the file is already on the public medium can further comprise, after the file is already on the public medium, signing a message indicative of that the first key is no longer used in signing a file with the first key and recording a resulting message signature and the message on the public medium, and recording the first key on the public medium.

In some embodiments, the method for electronic signature can further include verifying the key certificate prior to signing a file with the first key.

In another aspect of the disclosure, an apparatus for electronic signature is provided. The apparatus can comprise a public medium and a processor. The public medium can be configured to ensure that information published thereon is not tampered with. The processor can be configured to obtain a hash value of a first key created for a user and a user identifier of the user; generate a key certificate of the first key based on the obtained hash value, the user identifier, and a current key; record the key certificate on the public medium; sign a file with the first key and record a resulting file signature and the file on the public medium; and record the first key on the public medium only after the file is already on the public medium.

In some embodiments, the public medium can be a blockchain.

In some embodiments, the public medium can be a bulletin board operated by a trusted third party.

In some embodiments, the public medium can be a write-only database. Each data block written into the write-only database can be irrevocable and a consensus can be reached among all users.

In some embodiments, the number of the file can be one.

In some embodiments, recording the first key on the public medium only after the file is already on the public medium can further comprises, after the file is already on the public medium, signing a message indicative of the number of the files with the first key and recording a resulting message signature and the message on the public medium; and recording the first key on the public medium.

In some embodiments, recording the first key on the public medium only after the file is already on the public medium can further comprises, after the file is already on the public medium, signing a message indicative of that the first key is no longer used in signing a file with the first key and recording a resulting message signature and the message on the public medium; and recording the first key on the public medium.

In some embodiments, the processor can be further configured to verify the key certificate prior to signing a file with the first key.

In yet another aspect of the disclosure, a machine readable storage medium having a computer program stored thereon is provided. The computer program, when executed by a processor, can perform the method for electronic signature as described hereinabove.

The technical solution provided in the disclosure can be beneficial over prior in various aspects.

In an aspect, in the technical solution of the disclosure, a key certificate, which is generated based on the hash value of the first key and the user identifier, the user identifier and the current key, can be recorded on a public medium and the key certificate. The time of publication of the first key is not relevant. The user can sign the file with the first key and record (e.g., publishing) the first key on the public medium only after the signed file is already on the public medium. As a result, a publication of the first key is not limited by a time of publication thereof, so as to avoid a situation where a key (e.g., the first key), which has not been used, has to be published at the time of publication. Therefore, the key can be effectively used, and a waste of keys can be avoided.

In another aspect, in the technical solution of the disclosure, the number of the file is one. That said, a key can only be used to sign one file, and any other files that are signed with the key can be determined as a fake. Therefore, a situation where a key is thieved due to a hijack in recording the key on the public medium can be avoided. In another technical solution of the disclosure, if the number of files is more than one, a message indicative of the number of signed files or the first key no longer being used for signature can be recorded on the public medium prior to recording the first key on the public medium. Therefore, a situation where the first key is thieved due to a hijack in recording the key on the public medium can be avoided by not accepting a file signed with the first key.

BRIEF DESCRIPTION OF THE DRAWINGS

The novel features of the invention are set forth in the appended claims. A better understanding of the features and advantages of the present invention will be obtained with reference to the detailed description and drawings, which set out the descriptive embodiments with the principle of the present invention. The drawings are only for the purpose of illustrating the embodiments and should not be construed as limiting the invention. Throughout the drawings, the same elements are denoted by the same reference numerals, in the drawings:

DETAILED DESCRIPTION OF THE INVENTION

Figure 1:
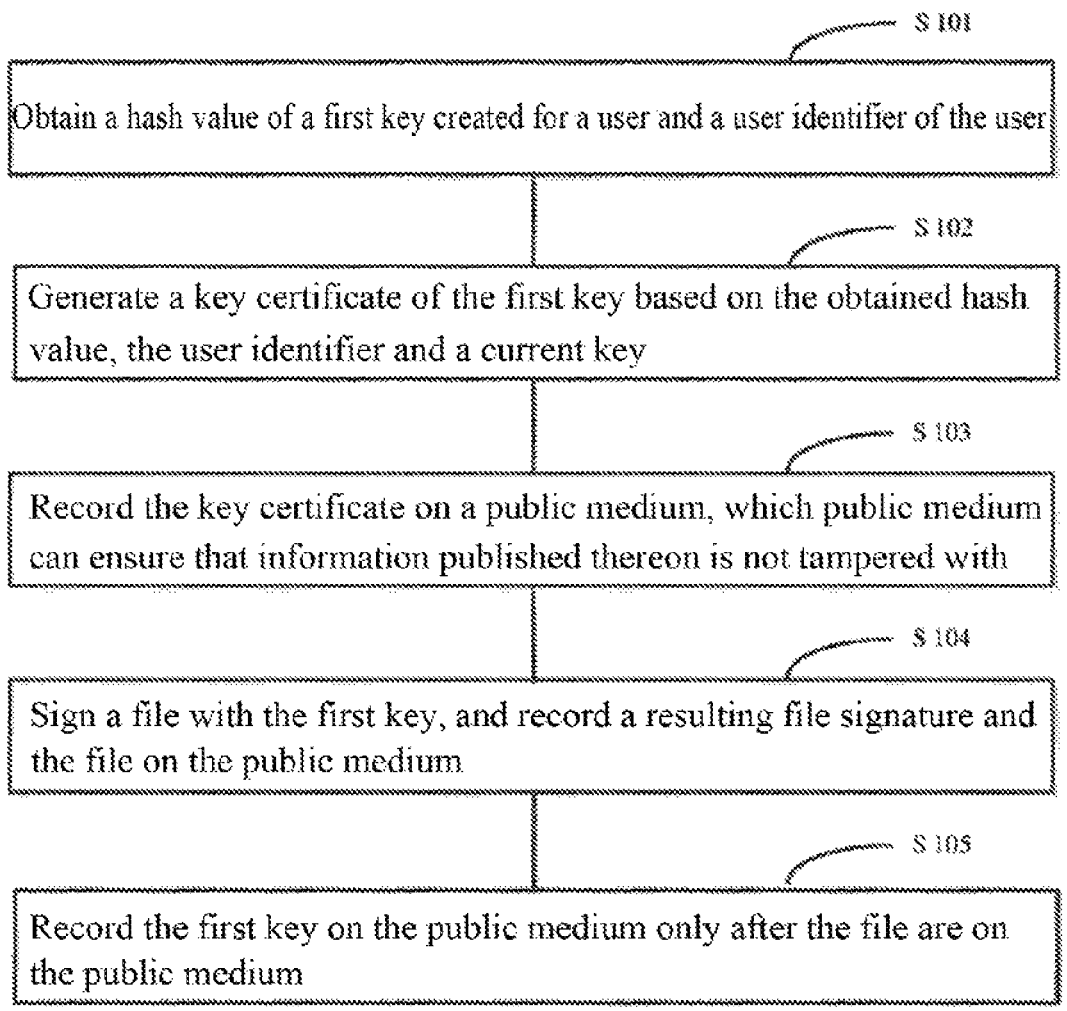
FIG. 1 illustrates a flow chart of a method for electronic signature in accordance with an exemplary embodiment of the disclosure.

Exemplary embodiments of the disclosure will be described in more detail with reference to the accompanying drawings. While the exemplary embodiments of the disclosure are shown in the drawings, it shall be understood that the invention can be embodied in various forms and not limited by the embodiments set forth herein. Rather, the embodiments are provided so that the disclosure will be more comprehensively understood, and the scope of the disclosure can be fully conveyed to those skilled in the art. Nothing in the following detailed description is intended to suggest that any particular component, feature or process is indispensable to the present invention. Those skilled in the art will appreciate that various features or processes can be substituted or combined with each other without departing from the scope of the disclosure.

FIG. 1 illustrates a flow chart of a method for electronic signature in accordance with an exemplary embodiment of the disclosure. As shown in FIG. 1, the method for electronic signature can comprise processes S101 to S105.

In process S101, a hash value of a first key created for a user and a user identifier of the user can be obtained.

In process S102, a key certificate of the first key can be generated based on the obtained hash value, the user identifier and a current key.

In process S103, the key certificate can be recorded on a public medium, which public medium can ensure that information published thereon is not tampered with.

In process S104, a file can be signed with the first key, and a resulting file signature and the file can be recorded on the public medium.

In process S105, the first key can be recorded on the public medium only after the file is already on the public medium.

In the method for electronic signature according to an exemplary embodiment of the disclosure, a hash value of the first key and the user identifier can first be obtained, and the key certificate of the first key can then be generated based on the obtained hash value, the user identifier and the current key. The first key herein can refer to any key created for the user by the user himself or a trusted third party. The key can be created in any manner known in the art or in the future. The invention is not limited in this regard. The current key herein can refer to a valid key currently used by the user. The current key can be an initial key signed by a trusted third party or a key created prior to creating the first key. In some instances, the first key is a key k, and the user identifier of the user to which the key k belongs is A, then obtaining the hash value of the key k and the user identifier A can be hash (A, k). The key certificate of the first key can be generated based on hash (A, k), user identifier A and current key k0. In other words, the key certificate of the first key can be obtained by signing the user identifier A and hash (A, k) with the current key k0 (i.e., (A, hash (A, k))). After the key certificate of the first key is recorded on the public medium, the user can sign a file with the first key. After the signed file is recorded on the public medium, the user can record (e.g., publish) the first key on the public medium. Since a generation of the key certificate of the first key does not involve the time of publication of the first key and the first key is recorded on the public medium only after the signed file is already on the public medium, a publication of the first key is not limited by the time of publication thereof. Therefore, a situation where the first key is published at the time of publication even if it is not used can be avoided. This way, the key can be effectively used without a waste.

In some embodiments, the public medium can be a blockchain. A blockchain is a chained data structure formed by chronologically linking data in a series of blocks. A blockchain is also a distributed ledger on which it is cryptographically guaranteed that data is not tampered with and faked. The blockchain can use encryption techniques (e.g., hashing and signature) and consensus algorithms to establish a trust mechanism, which makes the cost of repudiation, tampering and fraud formidable, ensuring that data cannot be tampered with and faked. It can be appreciated that the blockchain can be implemented in any manner known in the art or in the future, such as Bitcoin, Ethereum, and the like.

In alternative embodiments, the public medium can be a bulletin board system (BBS) operated by a trusted third party (TTP). In other words, tamper-proofing of the data published on the BBS is guaranteed by the trusted third party. The trusted third party can be an organization which provides maintenance and operation services for various systems. The trusted third party can obtain a credible qualification through legal, administrative and commercial procedures. The trusted third party can be governed by relevant national regulatory bodies. In still alternative embodiments, the public medium can be a write-only database. Any data block written into the write-only database is irrevocable, and a consensus is reached among all users. The write-only database can be a database which allows a data writing. Reaching a consensus can indicate that all users recognize an authenticity of the written data and a state of the data as not being tampered with. It shall be understood that, the public medium can be implemented in any manner known in the art or in the future as long as a tamper-proofing is ensured. The invention is not limited in this respect.

In some embodiments, the number of the file can be one. That said, a key can only be used to sign one file, and any other files that are signed with the key can be determined as a fake. Therefore, a situation where a key is thieved due to a hijack in recording the key on the public medium can be avoided. In some cases, the public medium can be configured to accept only the first file signed with the key. This way, even if the key k is hijacked by a user B in recording the key k on the public medium and the user B signs a file b with the key k and records it on the public medium, the public medium can refuse to store the file b by checking and confirming that a file signed with the key k already being recorded thereon. For example, a second use of the key k can be prevented by a consensus mechanism in the blockchain.

In some embodiments, if more than one file is signed with the key k (e.g., the first key), recording the first key on the public medium only after the files are already on the public medium in process S105 can further comprise, after the files are recorded on the public medium, signing a message indicative of the number of the files with the first key and recording the resulting message signature and the message on the public medium, and recording the first key on the public medium.

As discussed, if the user signs a plurality of files with the key k, the user can sign the message indicative of the number of the files with the key k and record the resulting message signature and the message on public medium after all of the signed files exist on the public medium, and then record key k on the public medium. The message indicative of the number of the files can contain information about how many files have been signed with the key k. For instance, assuming that a user Alice (e.g., the user identifier being A) has signed 23 files with the key k, the message can be "Alice has signed 23 files with hash (A, k)". It will be appreciated by those skilled in the art that, the message indicative of the number of the files can be implemented in any manner known in the art or in the future, as long as the number of files can be indicated. The present invention is not limited in this respect. The public medium such as blockchains and/or bulletin boards can be configured to calculate the number of files thereon that are associated with hash (A, k) and compare the calculated number of files with the number indicated by said message indicative of the number of the files. If the calculated number of files is equal to the number indicated by said message indicative of the number of the files, a record of the key k can be accepted, while any file signed with the key k after the record of the key k can be rejected. This can be achieved by the nature of the blockchain and/or the BBS that data is unchangeable and exists permanently once the data is written and a consensus is reached.

In alternative embodiments, if more than one file is signed with the key k (e.g., first key), recording the first key on the public medium only after the files are already on the public medium in process S105 can further comprise, after the files are recorded on the public medium, signing a message indicative of that the first key is no longer used in signing a file with the first key and recording the resulting message signature and the message on the public medium, and recording the first key on the public medium. In other words, subsequent to recording all the files signed with the key k on the public medium and prior to recording the key k on the public medium, the key k can be used to sign the message indicative of that the key k is no longer used to sign a file, and the message and the resulting message signature can be recorded on public medium. The message can be, for example, "No more signatures with hash (A, k)". This way, a situation where a key is thieved due to a hijack in recording the key on the public medium can be avoided. The message indicative of that the key k is no longer used in signing the file can be implemented in any manner known in the art or in the future as long as it can indicate that the key k is no longer used. The present invention is not limited in this respect.

In some embodiments, the method for electronic signature according to an exemplary embodiment of the disclosure can further comprise verifying the key certificate prior signing the file with the first key. The purpose of verifying the key certificate is to prove that the first key is indeed owned by the user. Normally, an initial key of the user can be signed by a trusted third party, such that the initial key can be verified. The key that is subsequently created can be signed by the previously created key. For instance, the nth key can be signed by the n−1th key, and all these signatures can be published on the public medium. After the n−1th key is published, other users can verify the signature of the nth key, thereby verifying the key certificate of the nth key. As an example, after the current key k0 is published, other users can verify the key certificate of the first key using the current key k0. This way, an identity of the user can be verified.

Figure 2:
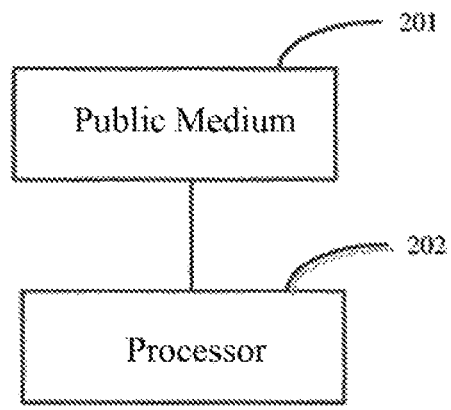
FIG. 2 illustrates a schematic structural diagram of an apparatus for electronic signature in accordance with an exemplary embodiment of the disclosure.

FIG. 2 shows a schematic structural diagram of an apparatus for electronic signature in accordance with an exemplary embodiment of the disclosure. As shown in FIG. 2, the apparatus for electronic signature can comprise a public medium 201 and a processor 202. The public medium 201 can be configured to ensure that the information published thereon is not tampered with. The processor 202 can be configured to obtain a hash value of a first key created for the user and a user identifier of the user, generate a key certificate of the first key based on the obtained hash value, the user identifier and the current key, record the key certificate on the public medium 201, which public medium 201 being configured to ensure that information published thereon is not tampered with, sign a file with the first key and record the resulting file signature and the file on the public medium 201, and record the first key on the public medium 201 only after the file is already on the public medium 201.

As discussed, the apparatus for electronic signature in accordance with exemplary embodiment of the disclosure can first obtain a hash value of the first key and the user identifier, and then generate the key certificate of the first key based on the obtained hash value, the user identifier and the current key. The first key herein can refer to any key created for the user by the user himself or by a trusted third party. The current key can be created in any manner known in the art or in the future. The present invention is not limited in this regard. The current key herein can refer to a valid key currently used by the user. The current key can be an initial key signed by a trusted third party or a key created prior to creating the first key. In some instances, the first key is a key k, and the user identifier of the user to which the key k belongs is A, then obtaining the hash value of the key k and the user identifier A can be hash (A, k). The key certificate of the first key can be generated based on hash (A, k), user identifier A and current key k0. In other words, the key certificate of the first key can be obtained by signing the user identifier A and hash (A, k) with the current key k0. After the key certificate of the first key is recorded on the public medium 201, the user can sign a file with the first key. After the signed file is recorded on the public medium 201, the user can record (e.g., publish) the first key on the public medium 201. Since a generation of the key certificate of the first key does not involve the time of publication of the first key and the first key is recorded on the public medium 201 only after the signed file is already on the public medium 201, a publication of the first key is not limited by the time of publication thereof. Therefore, a situation where the first key is published at the time of publication even if it is not used can be avoided. This way, the key can be effectively used without a waste.

In some embodiments, the public medium 201 can be a blockchain. A blockchain is a chained data structure formed by chronologically linking data in a series of blocks. A blockchain is also a distributed ledger on which it is cryptographically guaranteed that data is not tampered with and faked. The blockchain can use encryption techniques (e.g., hashing and signature) and consensus algorithms to establish a trust mechanism, which makes the cost of repudiation, tampering and fraud formidable, ensuring that data cannot be tampered with and faked. It can be appreciated that the blockchain can be implemented in any manner known in the art or in the future, such as Bitcoin, Ethereum, and the like.

In alternative embodiments, the public medium 201 can be a bulletin board system (BBS) operated by a trusted third party (TTP). In other words, tamper-proofing of the data published on the BBS is guaranteed by the trusted third party. The trusted third party can be an organization which provides maintenance and operation services for various systems. The trusted third party can obtain a credible qualification through legal, administrative and commercial procedures. The trusted third party can be governed by relevant national regulatory bodies. In still alternative embodiments, the public medium 201 can be a write-only database. Any data block written into the write-only database is irrevocable, and a consensus is reached among all users. The write-only database can be a database which allows a data writing. Reaching a consensus can indicate that all users recognize an authenticity of the written data and a state of the data as not being tampered with. It shall be understood that, the public medium 201 can be implemented in any manner known in the art or in the future as long as a tamper-proofing is ensured. The invention is not limited in this respect.

In some embodiments, the number of the file can be one. That said, a key can only be used to sign one file, and any other files that are signed with the key can be determined as a fake. Therefore, a situation where a key is thieved due to a hijack in recording the key on the public medium can 201 be avoided. In some cases, the public medium 201 can be configured to accept only the first file signed with the key. This way, even if the key k is hijacked by a user B in recording the key k on the public medium 201 and the user B signs a file b with the key k and records it on the public medium 201, the public medium 201 can refuse to store the file b by checking and confirming that a file signed with the key k already being recorded thereon. For example, a second use of the key k can be prevented by a consensus mechanism in the blockchain.

In some embodiments, if more than one file is signed with the key k (e.g., the first key), recording the first key on the public medium 201 only after the files are already on the public medium 201 can further comprise, after the files are recorded on the public medium 201, signing a message indicative of the number of the files with the first key and recording the resulting message signature and the message on the public medium 201, and recording the first key on the public medium 201.

As discussed, if the user signs a plurality of files with the key k (e.g., the first key), the user can sign the message indicative of the number of the files with the key k and record the resulting message signature and the message on public medium 201 after all of the signed files exist on the public medium 201, and then record key k on the public medium 201. The message indicative of the number of the files can contain information about how many files have been signed with the key k. For instance, assuming that a user Alice (e.g., the user identifier being A) has signed 23 files with the key k, the message can be "Alice has signed 23 files with hash (A, k)". It will be appreciated by those skilled in the art that, the message indicative of the number of the files can be implemented in any manner known in the art or in the future, as long as the number of files can be indicated. The present invention is not limited in this respect. The public medium 201 such as blockchains and/or bulletin boards can be configured to calculate the number of files thereon that are associated with hash (A, k) and compare the calculated number of files with the number indicated by said message indicative of the number of the files. If the calculated number of files is equal to the number indicated by said message indicative of the number of the files, a record of the key k can be accepted, while any file signed with the key k after the record of the key k can be rejected. This can be achieved by the nature of the blockchain and/or the BBS that data is unchangeable and exists permanently once the data is written and a consensus is reached.

In alternative embodiments, if more than one file is signed with the key k (e.g., first key), recording the first key on the public medium 201 only after the files are already on the public medium 201 can further comprise, after the files are recorded on the public medium 201, signing a message indicative of that the first key is no longer used in signing a file with the first key and recording the resulting message signature and the message on the public medium 201, and recording the first key on the public medium 201. In other words, subsequent to recording all the files signed with the key k on the public medium 201 and prior to recording the key k on the public medium 201, the key k can be used to sign the message indicative of that the key k is no longer used to sign a file, and the message and the resulting message signature can be recorded on public medium 201. The message can be, for example, "No more signatures with hash (A, k)". This way, a situation where a key is thieved due to a hijack in recording the key on the public medium can be avoided. The message indicative of that the key k is no longer used in signing the file can be implemented in any manner known in the art or in the future as long as it can indicate that the key k is no longer used. The present invention is not limited in this respect.

In some embodiments, the processor 202 can be further configured to verify the key certificate prior signing the file with the first key. The purpose of verifying the key certificate is to prove that the first key is indeed owned by the user. Normally, an initial key of the user can be signed by a trusted third party, such that the initial key can be verified. The key that is subsequently created can be signed by the previously created key. For instance, the nth key can be signed by the n−1th key, and all these signatures can be published on the public medium 201. After the n−1th key is published, other users can verify the signature of the nth key, thereby verifying the key certificate of the nth key. As an example, after the current key k0 is published, other users can verify the key certificate of the first key using the current key k0. This way, an identity of the user can be verified.

In summary, with the technical solution of the disclosure, the first key can be recorded on the public medium 201 after all the files signed with the first key already exist on the public medium 201. This way, the user can decide how many files to be signed with a key and create another key when he or she does not want to use the key (e.g., creating a new key). A further key can be created with the new key, and said further can be used, without having to create multiple keys in advance.

In an aspect of the disclosure, a machine-readable storage medium is further provided. The machine-readable storage medium can have a computer program stored thereon. The computer program, when executed by a processor, can perform the method for electronic signature described in detail hereinabove in the disclosure. In some embodiments, the machine readable storage medium can be a tangible component provided in a digital processing device. In alternative embodiments, the machine readable storage medium can be optionally removable from the digital processing device. In some embodiments, non-limiting example of the machine readable storage medium can include a USB drive, a removable hard disk, a Read-Only Memory (ROM), and a Random Access Memory (RAM), a Flash Memory, a Programmable Read Only Memory (PROM), an Erasable Programmable Read Only Memory (EPROM), a Solid State Memory, a disk, an optical disk, a cloud computing system or service.

It shall be understood that the various processes recited in the method embodiments of the disclosure can be performed in a different order and/or in parallel. Moreover, the method embodiments can include additional processes and/or omit an illustrated process. The scope of the invention is not limited in this respect.

Numerous specific details are set forth in the description provided in the disclosure. However, it shall be understood that embodiments of the disclosure can be practiced without these specific details. Known methods, structures and techniques are not shown in detail in some embodiments so as not to obscure the understanding of the present specification.

While the exemplary embodiments of the present invention have been shown and described herein, it is understood that numerous variations, changes and substitutions will now occur to those skilled in the art without departing from the present invention. It should be understood that various alternatives to the embodiments of the present invention described herein can be employed in practicing the present invention. It is intended that the following claims define the scope of the invention and methods, structures within the scope of the claims, and their equivalents be covered thereby.

What is claimed is:

1. A method for electronic signature, comprising:
    obtaining a hash value of a first key created for a user and a user identifier of the user;
    generating a key certificate of the first key based on the obtained hash value, the user identifier and a current key currently used by the user;
    recording the key certificate on a public medium, wherein the public medium is configured to ensure information published thereon being not tampered with;
    signing a file with the first key and recording a resulting file signature and the file on the public medium; and
    recording the first key on the public medium only after the file is already on the public medium, wherein recording the first key on the public medium only after the file is already on the public medium further comprises:
    after the file is already on the public medium, signing a message indicative of that the first key is no longer used in signing a file with the first key and
    recording a resulting message signature and the message on the public medium; and
    recording the first key on the public medium.

2. The method for electronic signature of claim 1, wherein the public medium is a blockchain.

3. The method for electronic signature of claim 1, wherein the public medium is a bulletin board operated by a trusted third party.

4. The method for electronic signature of claim 1, wherein the public medium is a write-only database, and wherein each data block written into the write-only database is irrevocable, and a consensus is reached among all users.

5. The method for electronic signature of claim 1, wherein the number of the file is one.

6. The method for electronic signature of claim 1, wherein recording the first key on the public medium only after the file is already on the public medium further comprises:
    after the file is already on the public medium, signing a message indicative of the number of the files with the first key and recording a resulting message signature and the message on the public medium; and
    recording the first key on the public medium.

7. The method for electronic signature of claim 1, further comprising verifying the key certificate prior to signing a file with the first key.

8. An apparatus for electronic signature, comprising a public medium and a hardware processor, wherein the public medium is configured to ensure information published thereon being not tampered with, and the hardware processor is configured to:
    obtain a hash value of a first key created for a user and a user identifier of the user;
    generate a key certificate of the first key based on the obtained hash value, the user identifier, and a current key currently used by the user;
    record the key certificate on the public medium;
    sign a file with the first key and record a resulting file signature and the file on the public medium; and
    record the first key on the public medium only after the file is already on the public medium, wherein recording the first key on the public medium only after the file is already on the public medium further comprises:
    after the file is already on the public medium, signing a message indicative of that the first key is no longer used in signing a file with the first key and recording a resulting message signature and the message on the public medium; and
    recording the first key on the public medium.

9. The apparatus for electronic signature of claim 8, wherein the public medium is a blockchain.

10. The apparatus for electronic signature of claim 8, wherein the public medium is a bulletin board operated by a trusted third party.

11. The apparatus for electronic signature of claim 8, wherein the public medium is a write-only database, and wherein each data block written to the write-only database is irrevocable, and a consensus is reached among all users.

12. The apparatus for electronic signature of claim 8, wherein the number of the file is one.

13. The apparatus for electronic signature of claim 8, wherein recording the first key on the public medium only after the file is already on the public medium further comprises:
   after the file is already on the public medium, signing a message indicative of the number of the files with the first key and recording a resulting message signature and the message on the public medium; and
   recording the first key on the public medium.

14. The apparatus for electronic signature of claim 8, wherein the processor is further configured to verify the key certificate prior to signing a file with the first key.

15. A non-transitory machine readable storage medium having a computer program stored thereon, wherein the computer program, when executed by a hardware processor, performs operations of:

obtaining a hash value of a first key created for a user and a user identifier of the user;

generating a key certificate of the first key based on the obtained hash value, the user identifier and a current key currently used by the user;

recording the key certificate on a public medium, wherein the public medium is configured to ensure information published thereon being not tampered with;

signing a file with the first key and recording a resulting file signature and the file on the public medium; and recording the first key on the public medium only after the file is already on the public medium, wherein recording the first key on the public medium only after the file is already on the public medium further comprises:

after the file is already on the public medium, signing a message indicative of that the first key is no longer used in signing a file with the first key and recording a resulting message signature and the message on the public medium; and recording the first key on the public medium.

\* \* \* \* \*